UNITED STATES PATENT OFFICE.

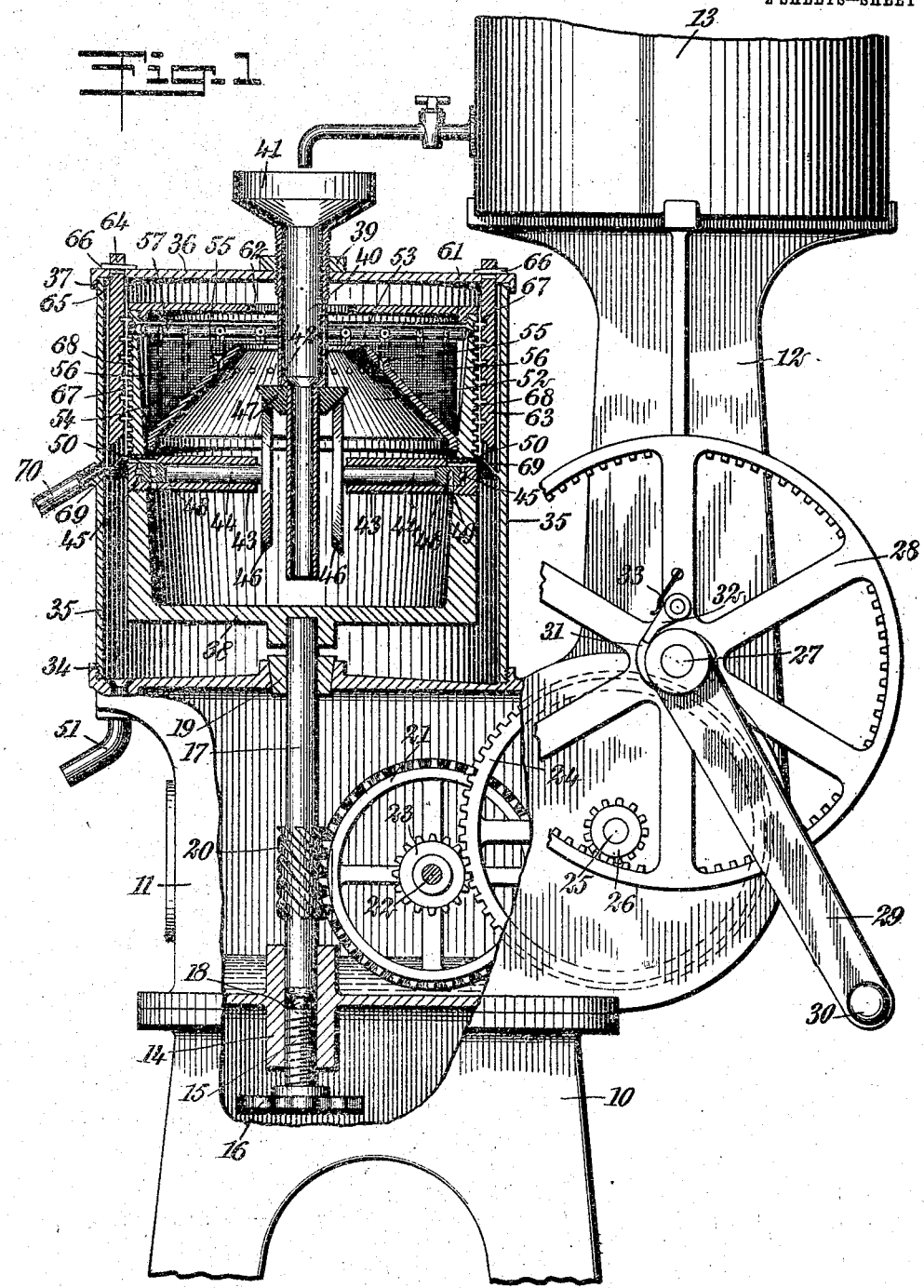

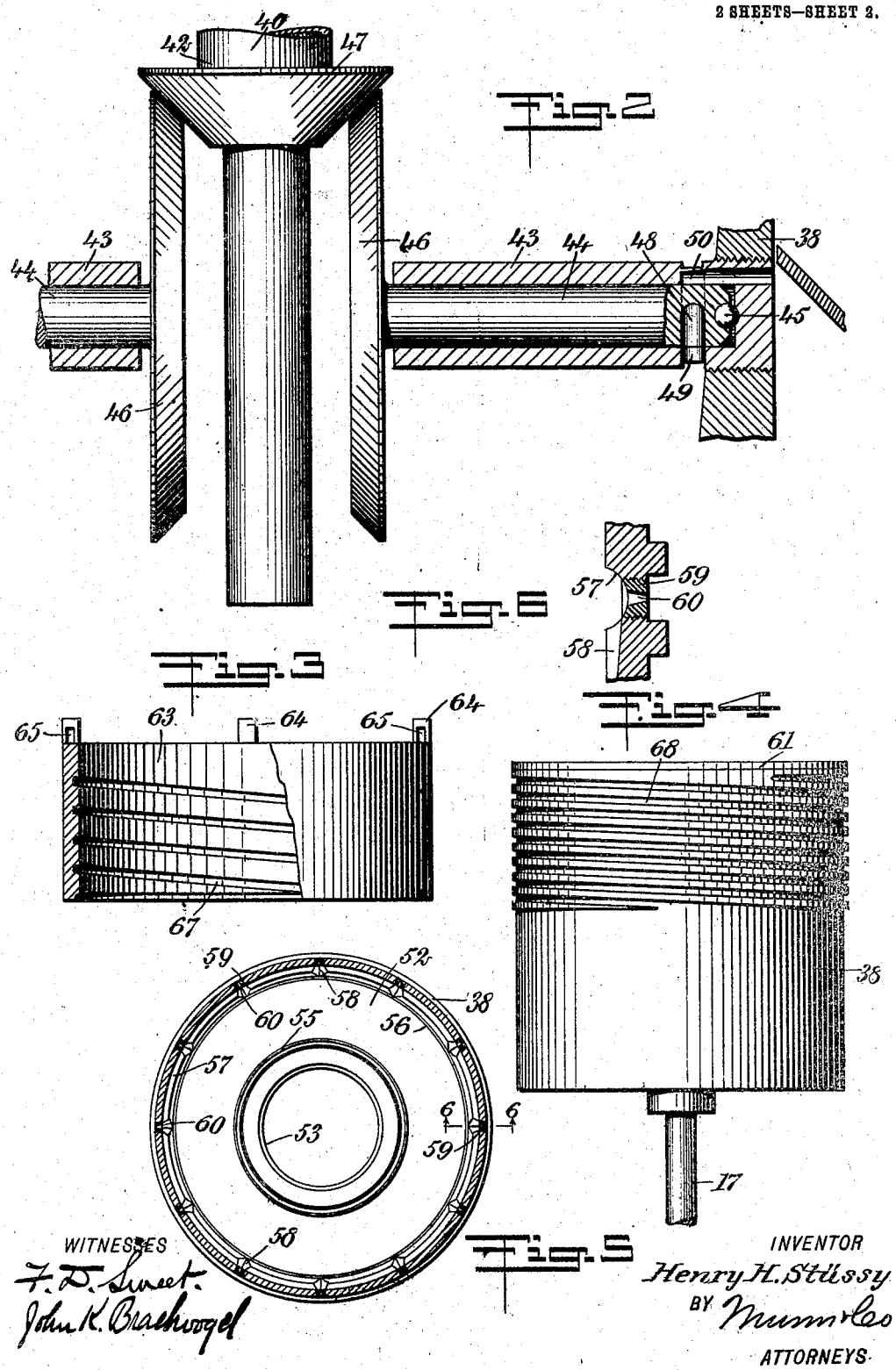

HENRY H. STÜSSY, OF SIOUX CITY, IOWA.

MILK PURIFYING AND HOMOGENIZING MACHINE.

No. 900,446.  Specification of Letters Patent.  Patented Oct. 6, 1908.

Application filed February 27, 1908. Serial No. 418,040.

*To all whom it may concern:*

Be it known that I, HENRY H. STÜSSY, a citizen of the United States, and a resident of Sioux City, Leeds Station, in the county of Woodbury and State of Iowa, have invented a new and Improved Milk Purifying and Homogenizing Machine, of which the following is a full, clear, and exact description.

This invention relates to milk purifying and homogenizing machines, and more particularly to machines of this class in which milk is passed centrifugally through purifying and homogenizing media, and in which the impurities and the homogenized milk are separately discharged from the machine.

More specifically, the invention relates to machines in which the impurities in milk are separated out centrifugally from the same, and in which the milk is conducted through straining media and then through an irregularly shaped conduit, which causes the globules of butter fat to be broken up or comminuted, and disseminated throughout the milk.

An object of the invention is to provide a machine of the class described, by means of which milk is rendered stable and insensitive to souring causes.

A further object of the invention is to provide a milk purifying and homogenizing machine, in which the milk is passed through straining media and through irregularly shaped conduits or passages which cause the globules of butter fat to be broken up and thoroughly disseminated throughout the milk.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which Figure 1 is a side view of the machine showing parts broken away and parts in longitudinal section; Fig. 2 is an enlarged longitudinal section showing certain of the means for removing the impurities from the milk and the means for operating the same; Fig. 3 is an enlarged, longitudinal, partial section showing a fixed cylinder, which, with a movable cylindrical receptacle, forms the irregularly shaped conduits or passages; Fig. 4 is an enlarged elevation showing the cylindrical milk receptacle; Fig. 5 is a transverse section of the latter; and Fig. 6 is a transverse section on the line 6—6 of Fig. 5.

Before proceeding to a more detailed explanation of my invention, it should be understood that while the same is particularly useful as a milk purifying and homogenizing machine it can also be used for purifying and homogenizing other fluids. By the term "homogenizing" as used in this specification and the claims hereinafter, I intend to signify the comminution or breaking up of agglomerations of substances in a fluid, into small, separated masses, and the dissemination throughout the fluid, of the same in very finely divided particles. For example, the butter fat of milk is usually contained therein in small globules, and by means of my machine these globules are thoroughly broken up and disseminated throughout the body of the milk. The purpose of this action is to prevent the gathering together of the butter fat, with the consequent rendering of the milk more sensitive to souring causes. Milk which has undergone a purifying and homogenizing process in my machine, will for days afterwards "test" the same as when it is discharged from the machine.

Raw milk usually contains impurities in greater or lesser quantities. These impurities comprise dirt, dust, hair, blood, fibrous matter and the like, and it is of course necessary to remove them to render the milk thoroughly fit for use. All such impurities are positively eliminated from the milk by means of my machine, before the milk undergoes the homogenizing process. Preferably, the milk is introduced into the machine at a temperature considerably higher than the normal temperature, whereby any possible germs in the milk are eliminated.

The machine includes an outwardly tapered receptacle for the milk, and means for revolving the receptacle so that the milk is discharged centrifugally therefrom and creeps up the sides of the receptacle in a uniform layer. It is essential that the milk be distributed evenly upon the sides of the vessel and to accomplish this it is necessary to adjust the parts with exactness. The milk passes from the receptacle, through a number of openings and then through a straining medium such as wire gauze or net. After this it escapes from the revolving vessel through openings in the side thereof. The receptacle is operated at a very high rate of speed, say from ten thousand to twelve thousand revolutions per minute. As the milk is preferably preheated it passes through the machine and escapes from the openings in the receptacle, substantially as a fine spray. Between the revolving receptacle and an outer fixed wall or casing is formed the homogenizing conduit or passage into which the spray passes. Ordinarily, mere churning through an irregular passage would not homogenize the milk but would form butter; however, the velocity of the particles of milk and the globules of butter fat, and the fine state of division of the milk in passing through the homogenizing conduit of my machine, effect a homogenizing action, and the butter fat globules are hurled against the irregularities of the conduit and are finely subdivided thereby.

Referring more particularly to the drawings, I provide a base or standard 10 upon which is carried a boxing 11. At one side, the latter is extended to form an upwardly disposed standard 12 upon which is mounted a tank 13 for the raw milk. If so desired, the standard may carry a heater for preheating the milk. The boxing 11 has a substantially vertical bearing 14 which is interiorly threaded at the lower end and has adjustably arranged therein a screw stem 15 provided with a hand-wheel 16 by means of which it can be manipulated. A shaft 17 has the lower end journaled in the bearing 14 and resting upon a ball or roller 18. The latter is seated in a suitable recess formed in the end of the stem 15. The top of the boxing 11 has a bearing 19 through which passes the shaft 17, and which is preferably of flexible material. The shaft 17 has formed thereon a worm 20 which is in mesh with a worm wheel 21 arranged within the casing upon a suitable spindle 22. Rigid with the worm wheel 21 is a pinion 23 in mesh with a gear wheel 24 also arranged within the boxing and mounted upon a spindle 25. The gear wheel 24 is rigid with the spindle 25, and the latter, outside of the boxing, carries a rigid pinion 26. The boxing is formed to receive an oil or some other substance which serves to lubricate the gears within the boxing. The standard 12 has journaled thereon a shaft 27 upon which is rigidly mounted a wheel 28 provided with interior teeth adapted to mesh with the pinion 26. A crank 29 rigid with the spindle 27 has a handle 30 and permits the manual operation of the wheel 28. The crank has a shoulder 31 mounted upon the wheel 28, which is engaged by a dog 32 normally held in position to be engaged by the shoulder, by a spring 33. It will be understood that while I have shown, for example, a machine which can be manually operated, I do not wish to limit myself to machines of this kind, but if so desired, can provide machines which are power-driven. By turning the crank 29 in one direction, the shoulder 31 engages the dog 32 and in this way the train of gears is operated to rotate the shaft 17.

The top of the boxing has an interiorly threaded rim 34 which receives the lower correspondingly threaded end of a cylindrical casing 35. The upper end of the casing is threaded and has mounted thereon a top 36 which has a threaded rim 37. Within the casing 35 is a cylindrical milk or other fluid receptacle 38, which is rigidly mounted upon the end of the shaft 17 and is arranged to rotate therewith. The top 36 has a central opening, and surrounding the same a collar 39 formed to receive a tubular member 40. At the outer end, the latter has a funnel shaped extension 41 and it is suitably threaded to engage with corresponding threads of the collar and the top, so that by turning the member 40 it can be adjusted longitudinally of the cylindrical casing. The tube 40 which serves for the introduction of the milk into the receptacle extends into the latter and has the lower end constricted to form a shoulder 42.

Within the receptacle 38 at the opposite sides thereof, are arranged arms 43 having threaded extremities arranged in correspondingly threaded openings of the sides of the receptacle. The arms have longitudinal bores in which are rotatably arranged spindles 44. At the ends of the latter, and seating against the closed ends of the arms, are bearing balls or rollers 45. The spindles project from the adjacent ends of the arms and each carries a beveled friction wheel 46 which engages a suitably beveled friction block or disk 47 mounted upon the tube 40 and engaging the shoulder 42. The friction wheel and the friction block or disk may be fashioned from any suitable material. Preferably the block or disk is formed from rubber or the like. The spindles, at the ends adjacent to the sides of the receptacle have recesses 48 adapted to register with openings 49 of the arms. The openings 49 communicate interiorly with the receptacle. The arms have other openings 50 which communicate with the outside of the receptacle, and with which the recesses 48 are also adapted to communicate.

The receptacle is tapered on the inside, towards the top, so that, as it is rotating, the contents thereof will tend to move upwardly along the tapered sides, under the influence of centrifugal action. As the block or disk 47 is fixed, the friction wheels 46 will be rotated in opposite directions as the receptacle is rotated. Consequently, the spindles will be rotated and the recesses 48 will thus alternately register with the openings 49 and 50. The impurities which are heavier than the milk, lie closely adjacent to the sides of the receptacle, and will move upward so that they will pass through the openings 49 and be received by the recesses 48, and will be transmitted by the latter to the openings 50 through which they can pass to the outside of the receptacle. The impurities will fall to the bottom of the casing 35 and can be drawn off from the latter by means of a suitable outlet 51.

Above the arms 43, the casing is provided with interior threads which engage the correspondingly threaded rim of a tapered cap 52 having a substantially central opening 53 surrounding the tube 40. Near the opening 53, the cap 52 has a plurality of symmetrically arranged outlet openings 54. At the outside of the cap, under the openings 54 is a lip 55. Between the outside of the cap and the sides of the receptacle is arranged a band of gauze 56 or similar straining or purifying material. The centrifugal action due to the rotation of the receptacle, forces the milk out through the openings of the cap, whereupon it passes through the strainer 56.

Near the upper rim of the receptacle on the inside, is provided a groove 57 which extends completely around the receptacle. Connected with the groove 57 are substantially parallel grooves 58 arranged longitudinally of the receptacle. The grooves 58 increase in depth and width as they approach the groove 57 and serve to direct the milk to the latter after the milk has passed through the strainer 56. The receptacle has a plurality of threaded openings at the groove 57 in which are arranged correspondingly threaded plugs 59 having outwardly tapered openings 60 therethrough. These openings 60 act as nozzles and permit the milk to escape from the groove 57 to the outside of the receptacle. A cover 61 is removably mounted at the upper rim of the receptacle by means of a threaded flange, or in any other convenient manner, and has a substantially central opening 62 around the tube 40.

Surrounding the upper portion of the receptacle 38 is a substantially cylindrical member 63. The latter has at the upper edge, lugs 64 which extend through suitable openings of the casing top 36 and have slots 65 formed to receive wedges 66, by means of which the cylinder 63 can be firmly secured in position and adjusted. At the inside, the cylindrical member 63 has a spiral groove 67. The lower rim of the cylindrical member is outwardly beveled. The upper portion of the receptacle, that is, the portion within the cylindrical member 63, is also provided with spiral grooves 68 which are preferably closer together than the groove 67, and of less pitch. The cylindrical member 63 and the receptacle, thus form an irregularly shaped conduit through which the milk must pass after it is discharged from the receptacle. The spiral form of the irregularities of the cylinder and the receptacle, assist the milk in moving downward at the outside of the receptacle. The milk passes from between the cylindrical member and the receptacle and is caught by an annular shelf 69 formed at the inside of the casing, and serving to direct it to the milk outlet 70.

In passing through the conduits formed by the cylinder and the receptacle, the milk is thoroughly homogenized, and thus the globules of butter fat are broken up by engagement with the spiral grooves and projections of the walls of the conduit. The rapid movement of the receptacle itself, assists the breaking up of the globules, and at the same time tends to hasten the movement of the milk toward the shelf 69. Before the milk escapes from the receptacle it is thoroughly purified by the spindle valves 44 and by the strainer 56.

The central location of the tube 40 permits the introduction of the milk centrally with respect to the receptacle, and thereby is assured the even distribution of the milk to the sides of the receptacle. The receptacle itself, is adjustable in the direction of its longitudinal axis and the cylinder 63 is also adjustable. Consequently, the homogenizing conduit can be regulated to a certain extent. The openings 49 in the arms 43 are preferably arranged in grooves of the arms. The openings 50, if so desired, may be provided with means for adjusting them to regulate the passage of the impurities therethrough. The screen 56 serves to distribute the milk uniformly in all directions and to direct it evenly and continuously to the grooves 57 and 58. The continuous annular lip 55 forms a circular spray when the machine is running properly.

While I have shown the lugs 64 provided with openings to receive wedges, it will be understood that they may be of any other suitable form for the purpose, and may, for example, consist of threaded shanks formed to receive suitably threaded nuts or the like.

If the machine is to be used in homogenizing and purifying greater quantities of milk, and is to operate continuously, I prefer to use two tanks, one of which is a supply tank having an outlet regulated by a float, and feeding into the other or heating tank, from which the milk is supplied in a heated and sterilized condition to the machine, by means of a siphon, or in any other convenient way. It should be noted that to effect the best results, the machine should be so operated that the milk is positioned in the bowl in a thin layer only.

Having thus described my invention, I claim as new, and desire to secure by Letters Patent:

1. In a machine of the class described, a receptacle for homogenizing milk, means for operating said receptacle to eject the milk therefrom at a high velocity whereby the milk escapes from said receptacle in the form of a spray, and irregularly shaped and spaced members arranged to receive the spray therebetween whereby the butter fat globules are comminuted.

2. In a machine of the class described a receptacle for milk, means for ejecting the milk from said receptacle, means in said receptacle for removing impurities from the milk, and irregularly shaped and spaced members arranged to receive therebetween the milk escaping from said receptacle.

3. In a machine of the class described, a rotatable receptacle for an emulsion, means in said receptacle for removing impurities from the emulsion, means in said receptacle for straining the emulsion, means for rotating said receptacle whereby the emulsion is centrifugally expelled therefrom, and a conduit having walls provided with projections and arranged to permit the passage therethrough of the emulsion after it escapes from the receptacle whereby the globules of material in the emulsion are comminuted.

4. In a machine of the class described, a movable, hollow member constituting a receptacle for milk, a fixed hollow member encompassing said movable member, means within said movable member and operated by a movement thereof for ejecting impurities from the milk in said movable member at the sides thereof, means for operating said movable member centrifugally to eject the milk therefrom, and means arranged to receive the milk escaping from said movable member and serving to homogenize the same.

5. In a machine of the class described, a rotatable milk receptacle, means for rotating the same whereby milk therein is expelled centrifugally, means within said receptacle and operable by the movement thereof for freeing the milk within said receptacle from impurities, means within said receptacle for directing the milk escaping therefrom, and homogenizing means arranged to receive the milk escaping from said receptacle.

6. In a machine of the class described, a rotatable milk receptacle, means for operating the same whereby milk therein is expelled centrifugally, means in said receptacle and operable by the movement thereof for eliminating impurities from milk in said receptacle, a homogenizing conduit arranged concentrically with respect to said receptacle, and means for directing milk from said receptacle to said conduit.

7. In a machine of the class described, a fixed member, a movable member constituting a receptacle for milk, the said members forming a conduit therebetween, means for operating said movable member to expel the milk therefrom, and means for directing the escaping milk to said conduit, in the form of a spray.

8. In a machine of the class described, a receptacle for fluid, a fixed wall about said receptacle, said receptacle and said wall constituting a homogenizing conduit and being provided at adjacent sides with irregularities, means for operating said receptacle to expel an emulsion therefrom at high velocity, and means for directing the escaping emulsion into said conduit in the form of a spray.

9. In a machine of the class described, a rotatable receptacle, a fixed cylinder encompassing said receptacle, said cylinder and said receptacle being so shaped interiorly and exteriorly respectively, that an irregular conduit is formed therebetween, means for rotating said receptacle whereby the contents thereof rise centrifugally upon the walls thereof toward the upper rim, and means within said receptacle for directing the contents thereof to said conduit.

10. In a machine of the class described, a fixed cylinder, a rotatable receptacle therewithin, said cylinder and said receptacle being so shaped interiorly and exteriorly respectively, that an irregular duct is formed therebetween, means within said receptacle and operable by the movement thereof for eliminating impurities from the contents thereof, means for operating said receptacle whereby the contents are discharged centrifugally, a straining medium for the contents and arranged within said receptacle near the point of discharge, and means within said receptacle for directing the contents to said duct.

11. In a machine of the class described, a fixed cylinder, a rotatable receptacle therewithin, said receptacle being interiorly and upwardly tapered, said cylinder and said receptacle having ribs interiorly and exteriorly respectively, and being arranged to form a conduit therebetween, means for introducing an emulsion into said receptacle and arranged substantially central with respect thereto, means within said receptacle and operable by a movement thereof for eliminating impurities from the contents at the sides of said receptacle, and means for rotating said receptacle whereby the contents are caused to rise upon the walls thereof, said receptacle having openings through the walls serving to direct the contents to said conduit.

12. In a machine of the class described, a fixed cylinder, a rotatable cylindrical receptacle therewithin, said receptacle being interiorly and upwardly tapered, said cylinder and said receptacle having ribs interiorly and exteriorly respectively and forming a conduit therebetween, means for introducing a fluid into said receptacle and arranged substantially central with respect thereto, means within said receptacle and operable by a movement thereof for eliminating impurities from the contents at the sides of said receptacle, a cap within said receptacle and having discharge openings through the wall thereof, said receptacle having discharge openings in the wall thereof and being provided with interior channels leading to said discharge openings in the wall, said discharge openings of said receptacle leading to said conduit, a straining medium between said cap and the wall of said receptacle, and means for rotating said receptacle whereby the contents thereof rise upon the walls thereof to escape through said discharge openings of said cap, said straining medium and said discharge openings of said receptacle.

13. In a machine of the class described, a receptacle, a spindle within said receptacle, means within said receptacle and operable frictionally through a movement of said receptacle to actuate said spindle, means controlled by said spindle, for removing from said receptacle material at the side thereof, means for introducing a fluid into said receptacle, means for operating said receptacle whereby the contents thereof are caused to rise at the sides and to be discharged centrifugally, and a homogenizing conduit arranged to receive the discharged contents of said receptacle.

14. In a machine of the class described, a casing, a cylindrical member fixed within said casing, a movable receptacle within said cylindrical member, said receptacle and said member forming an irregularly shaped conduit therebetween, means for operating said receptacle centrifugally to discharge the contents thereof to said conduit, a shelf within said casing and arranged to receive the contents of said receptacle after the same has passed through said conduit, and means within said receptacle for removing impurities from the contents thereof at the sides and discharging the impurities into said casing at the side of said shelf remote from said conduit.

15. In a machine of the class described, a movable receptacle, a cylindrical member encompassing said receptacle and forming therewith an irregularly shaped conduit, means for operating said receptacle whereby the contents thereof are discharged through said conduit, means for adjusting said receptacle longitudinally of said cylindrical member, and means for adjusting said cylindrical member longitudinally of said receptacle.

In testimony whereof I have signed my name to this specification in the presence of two subscribing witnesses.

HENRY H. STÜSSY.

Witnesses:
C. C. HAAS,
J. A. SMITH.